United States Patent
Ko et al.

(10) Patent No.: US 8,765,326 B2
(45) Date of Patent: Jul. 1, 2014

(54) JOINING DEVICE FOR FUEL CELL STACK AND FUEL CELL STACK PROVIDED WITH THE SAME

(71) Applicants: Hyundai Motor Company, Seoul (KR); Kia Motors Corporation, Seoul (KR); Korea Advanced Institute of Science and Technology, Daejon (KR)

(72) Inventors: Haeng Jin Ko, Seoul (KR); Young Bum Kum, Seoul (KR); Young Woo Noh, Guri (KR); Sae Hoon Kim, Yongin (KR); Sang Hyun Cho, Seoul (KR); Jung Do Suh, Seoul (KR); Kwi Seong Jeong, Yongin Gyeonggi-Do (KR); Junghan Yu, Yongin (KR); Byung Ki Ahn, Seongnam (KR); Duck Whan Kim, Seoul (KR); Sung Keun Lee, Suwon (KR); Dai Gil Lee, Daejeon (KR); Ha Na Yu, Mungyeong (KR)

(73) Assignees: Hyundai Motor Company, Seoul (KR); Kia Motors Corporation, Seoul (KR); Korea Advanced Institute of Science and Technology, Daejeon (KR)

(*) Notice: Subject to any disclaimer, the term of this patent is extended or adjusted under 35 U.S.C. 154(b) by 0 days.

(21) Appl. No.: 13/850,142

(22) Filed: Mar. 25, 2013

(65) Prior Publication Data
US 2013/0266891 A1 Oct. 10, 2013

Related U.S. Application Data

(62) Division of application No. 12/836,216, filed on Jul. 14, 2010, now Pat. No. 8,404,397.

(30) Foreign Application Priority Data

Oct. 14, 2009 (KR) .................. 10-2009-0097774

(51) Int. Cl.
*H01M 8/02* (2006.01)
*H01M 8/24* (2006.01)
*H01M 2/10* (2006.01)
*A44B 11/25* (2006.01)
*A44B 13/00* (2006.01)

(52) U.S. Cl.
USPC .............. 429/507; 429/452; 429/470; 24/302

(58) Field of Classification Search
USPC ......... 429/152, 433, 483, 460, 470, 510, 511, 429/507, 452; 24/302
See application file for complete search history.

(56) References Cited

U.S. PATENT DOCUMENTS

2003/0232233 A1* 12/2003 Andrews et al. ................. 429/37
2008/0044713 A1* 2/2008 Fritz et al. ........................ 429/36
2009/0226793 A1* 9/2009 Suh et al. ......................... 429/34

FOREIGN PATENT DOCUMENTS

DE 10 2008 040 503 A1 6/2009
DE 102008040503 * 6/2009 .............. H01M 2/02

*Primary Examiner* — Kenneth Douyette
(74) *Attorney, Agent, or Firm* — Edwards Wildman Palmer LLP; Peter F. Corless

(57) ABSTRACT

The present invention features a fuel cell stack that preferably includes an electricity generating assembly having a plurality of unit cells that are suitably disposed one after another; a pair of end plates pressedly disposed respectively at upper and lower ends of the electricity generating assembly; and a joining device suitably engaging the end plates by a rope, where pressure is applied to the electricity generating assembly by means of tension of the rope, and the length and tension of the rope is suitably controlled.

1 Claim, 7 Drawing Sheets

JOINING DEVICE FOR FUEL CELL STACK AND FUEL CELL STACK PROVIDED WITH THE SAME

CROSS-REFERENCE TO RELATED APPLICATIONS

This application is a Divisional Application of U.S. patent application Ser. No. 12/836,216, filed Jul. 14, 2010, now U.S. Pat. No. 8,404,397, which claims under 35 U.S.C. §119(a) priority to and the benefit of Korean Patent Application No. 10-2009-0097774 filed in the Korean Intellectual Property Office on Oct. 14, 2009, the entire contents of which are incorporated herein by reference.

BACKGROUND OF THE INVENTION (a) Field of the Invention

The present invention generally relates to a fuel cell stack. More particularly, the present invention relates to an engaging structure of a fuel cell stack.

(b) Description of the Related Art

Generally, a fuel cell stack is an electricity generating device that converts the chemical energy of fuel and an oxidizing agent into electrical energy.

Such a fuel cell stack preferably includes a plurality of unit cells disposed one after another, and each unit cell generates electrical energy by using the fuel and the oxidizing agent.

In the fuel cell stack, a plurality of unit cells are suitably pressed by a pair of end plates disposed at upper and lower ends of the unit cells, and the pair of end plates are engaged to each other by a joining device.

According to a conventional joining device, the unit cells are suitably pressed by engaging the pair of end plates by using a bolt and a nut or by a steel band.

In the former case, since the end plates are engaged by the bolt and the nut, a dead volume of the end plates for engaging the bolt and the nut is increased. As a result, the fuel cell stack is unsuitable for mounting in a vehicle, and the fuel cell stack cannot be compact.

In the latter case, if the length of the fuel cell stack is changed by elastic characteristics or a size deviation of the stack, a band corresponding to the length should be provided. Therefore, workability for assembling the stack may be deteriorated.

Accordingly, there remains a need in the art for improved joining devices for fuel cell stacks.

The above information disclosed in this the Background section is only for enhancement of understanding of the background of the invention and therefore it may contain information that does not form the prior art that is already known in this country to a person of ordinary skill in the art.

SUMMARY OF THE INVENTION

The present invention preferably features a joining device and a fuel cell stack provided with the same that preferably reduce a dead volume of end plates and engage the end plates with a predetermined pressure regardless of a length of the fuel cell stack.

A fuel cell stack according to an exemplary embodiment of the present invention may preferably include an electricity generating assembly having a plurality of unit cells that are suitably disposed one after another; a pair of end plates pressedly disposed respectively at upper and lower ends of the electricity generating assembly; and a joining device suitably engaging the end plates by a rope, that suitably applies pressure to the electricity generating assembly by means of tension of the rope, and controls the length and tension of the rope.

Preferably, the rope may connect the same side of the end plates to each other via the joining device.

In certain preferred embodiments, the joining device may preferably include a plurality of fastener assemblies that are suitably disposed on one end plate along the length direction thereof, connected to one end of each rope at both ends of the one end plate, and suitably supplying tension to the rope, and a plurality of first hook units suitably mounted on both sides of the other end plate along the length direction thereof corresponding to each fastener assembly so as to hook the other end of the rope.

Preferably, each fastener assembly may include a pair of engagement blocks that is suitably disposed on the one end plate and being slidable on the one end plate along a width direction thereof; a wedge member that is suitably configured to be mounted at each engagement block, the rope being coiled to the wedge member and the wedge member pressing the rope to the engagement block; and at least one lead screw engaged to the pair of engagement blocks so as to control a distance therebetween, and supplying tension to the rope.

In further preferred embodiments, each engagement block may preferably include a base member that is suitably disposed on the one end plate and formed of a wedge groove in which the wedge member is inserted, and a cover member suitably engaged to an upper surface of the base member so as to prevent the wedge member from being disengaged.

Preferably, the width of the wedge member may become narrower along a direction where the tension of the rope is suitably exerted, and the wedge member may be formed of a rope groove in which the rope is inserted at an exterior circumference thereof.

In certain preferred embodiments, the wedge groove corresponding to the wedge member may be formed at an upper surface of the base member.

In other preferred embodiments, the thread may be formed at a part of the lead screw, and the other part of the lead screw having a head portion may preferably have a rod shape.

Preferably, the of the pair of engagement blocks may be threaded to the part of the lead screw, and the other part of the lead screw may be inserted in the other of the pair of the engagement blocks.

In other further preferred embodiments, the first hook unit may include a plurality of hook bolts engaged to the both ends of the other end plate along the length direction thereof, and a washer engaged to the hook bolt so as to prevent the rope from being disengaged.

According to other preferred embodiments of the present invention, the joining device may further include a plurality of second hook units mounted on both sides of the one end plate along the length direction thereof corresponding to each fastener assembly so as to hook the rope.

Preferably, each fastener assembly may further include a tie member for fixing the rope coiled to the wedge member.

In further preferred embodiments, the tie member may be provided with a pair of tubes integrally connected to each other, and the rope may be inserted in one tube and then in the other tube.

In other further preferred embodiments, the one end plate may be formed of a receiving groove, and the engagement blocks of each fastener assembly may be slidably mounted on the receiving groove.

Preferably, a joining device for a fuel cell stack according to another exemplary embodiment of the present invention pressedly engages a pair of end plates disposed at upper and lower ends of a plurality of unit cells disposed one after another by a rope.

In certain preferred embodiments, the joining device may include a plurality of fastener assemblies that are suitably disposed at both side portions of one end plate along a length direction thereof, and are suitably connected to one rope catching one side portion of the unit cells and to another rope catching the other side portion of the unit cells, and that supply tension to the rope, and a plurality of hook units mounted at both side portions of the other end plate corresponding to each fastener assembly along the length direction so as to hook each rope.

In further preferred embodiments, each fastener assembly may include a pair of engagement blocks disposed on the one end plate and slidable along a width direction thereof; a plurality of wedge members suitably engaged to each engagement block so as to connect the ropes catching both side portions of the unit cells through the engagement block, and pressing the rope to the engagement block; and at least one lead screw engaged to the pair of engagement blocks so as to control a distance therebetween, and suitably supplying tension to the rope.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

Figure 1:
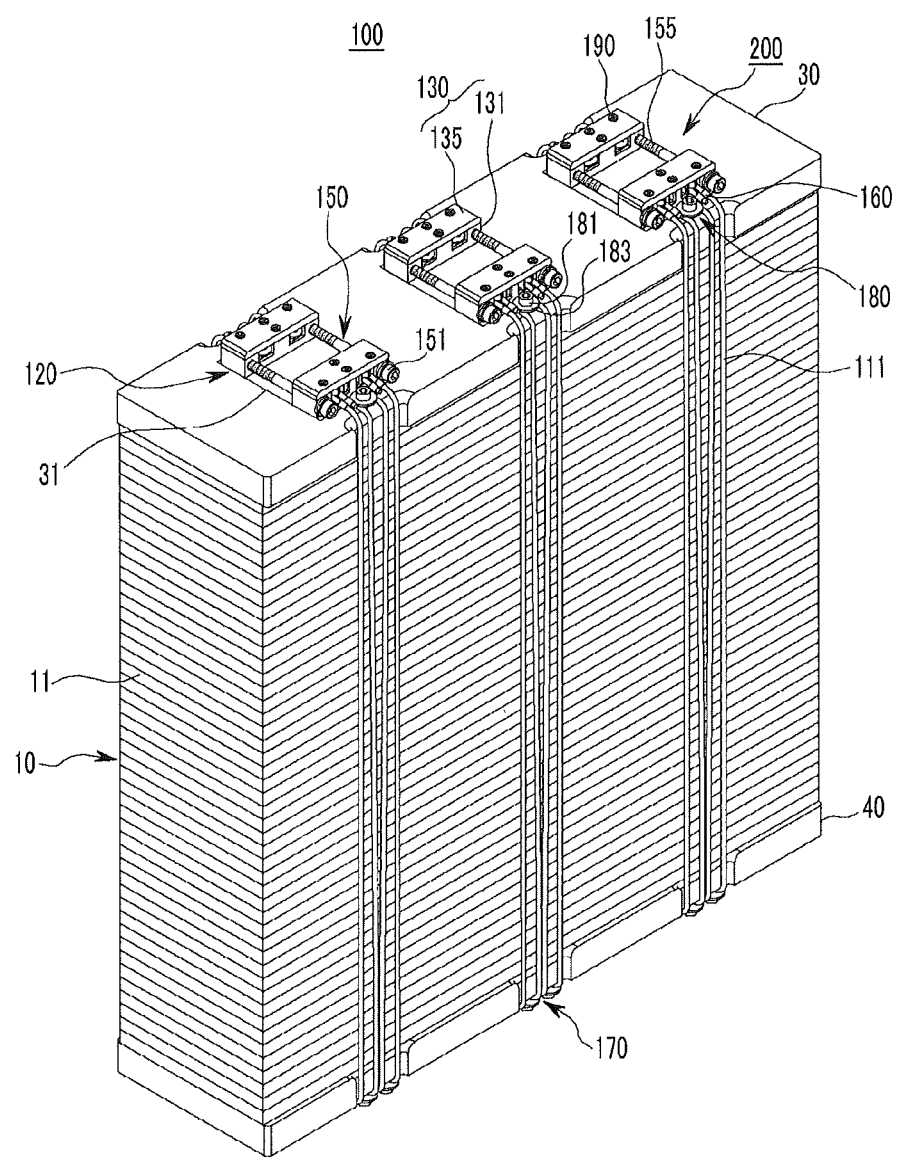
FIG. 1 is a perspective view showing a fuel cell stack according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE EMBODIMENTS

As described herein, the present invention features a fuel cell stack comprising an electricity generating assembly having a plurality of unit cells, a pair of end plates, and a joining device engaging the end plates by a rope.

In one embodiment, the plurality of unit cells are disposed one after another.

In another embodiment, the pair of end plates are pressedly disposed rat upper and lower ends of the electricity generating assembly.

In another further embodiment, the joining device applies pressure to the electricity generating assembly by means of tension on the rope, and controls the length and tension of the rope.

In another aspect, the present invention features a joining device for a fuel cell stack comprising a plurality of fastener assemblies, wherein the fastener assemblies are connected to a first rope and a second rope, and a plurality of hook units to hook each rope.

In one embodiment, the plurality of fastener assemblies are disposed at both side portions of one end plate along a length direction.

In another embodiment, the first rope is connected to one side portion of a unit cell of the fuel cell stack.

In another further embodiment, the second rope is connected to another side portion of a unit cell of the fuel cell stack.

In another embodiment, the plurality of hook units are mounted at both side portions of another end plate corresponding to each fastener assembly along the length direction so as to hook each rope.

In another further embodiment, the joining device pressedly engages the pair of end plates disposed at upper and lower ends of the unit cells.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Description of components that are not necessary for explaining the present invention will be omitted, and the same constituent elements are denoted by the same reference numerals in this specification.

In addition, the size and thickness of components shown in the drawings may differ from the actual size and real thickness of the components for better comprehension and ease of description.

The thickness of the components may be enlarged at many parts in the drawings for clear expression.

Figure 2:
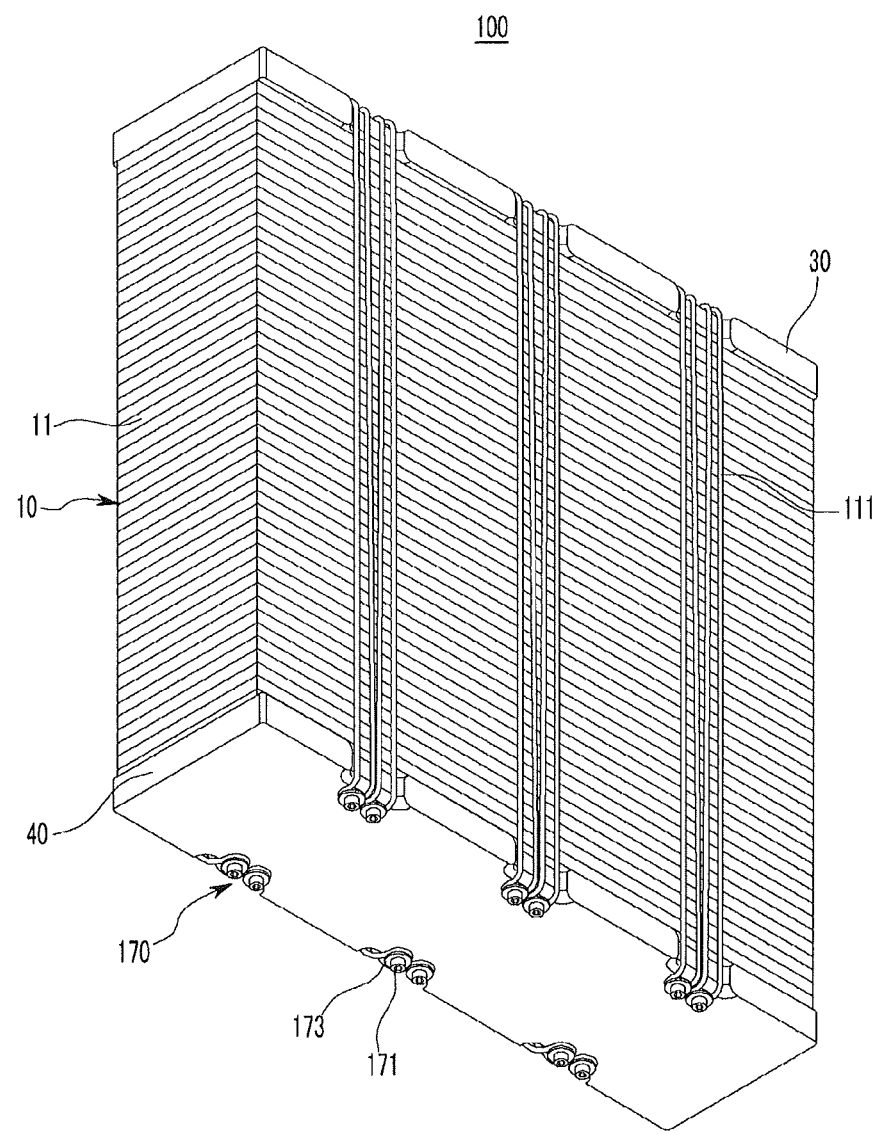
FIG. 2 is a bottom perspective view of FIG. 1.

FIG. 1 is a perspective view showing a fuel cell stack according to an exemplary embodiment of the present invention. FIG. 2 is an exemplary bottom perspective view of FIG. 1.

In a preferred exemplary embodiment and referring to the drawings, a fuel cell stack 100 according to an exemplary embodiment of the present invention preferably includes a plurality of fuel cells (hereinafter the fuel cell will be called a "unit cell") that generate electrical energy by a chemical reaction of a fuel and an oxidizing agent. Preferably, the plurality of fuel cells are disposed one after another.

In certain preferred embodiments, in an exemplary fuel cell stack 100, the plurality of unit cells 11 are pressedly engaged by a rope 111.

Accordingly, in further related embodiments, the fuel cell stack 100 preferably includes an electricity generating assembly 10, a pair of end plates 30 and 40, and a joining device 200 provided with the rope 111, and other constituent elements described herein.

In further preferred embodiments, the electricity generating assembly 10 is an assembly of unit cells 11 that preferably consist of a plurality of unit cells 11 suitably disposed one after another.

In certain preferred embodiments, in the unit cell 11, a separator (that is generally called a bipolar plate or a separating plate) is suitably disposed between membrane-electrode assemblies (MEA).

In certain exemplary embodiments, the pair of end plates 30 and 40 (that are generally called pressing plates) are contactedly disposed respectively to the uppermost and lowermost unit cells 11, for example as shown in the drawings.

Preferably, the end plates 30 and 40 are rectangular metal plates having an area corresponding to the unit cell 11.

According to further preferred embodiments of the present invention, one end plate 30 that is suitably disposed at an upper end of the electricity generating assembly 10 in the drawings is preferably called "first end plate", and the other end plate 40 disposed at a lower end of the electricity generating assembly 10 in the drawings is preferably called "second end plate".

According to a preferred exemplary embodiment, the joining device 200 suitably engages the first and second end plates 30 and 40 by the rope 111, suitably presses the electricity generating assembly 10 by tension of the rope 111, and suitably controls length and tension of the rope 111.

A joining device 200 of the fuel cell stack 100 according to a further exemplary embodiment of the present invention are described in further detail with reference to the accompanying drawings.

Figure 3:
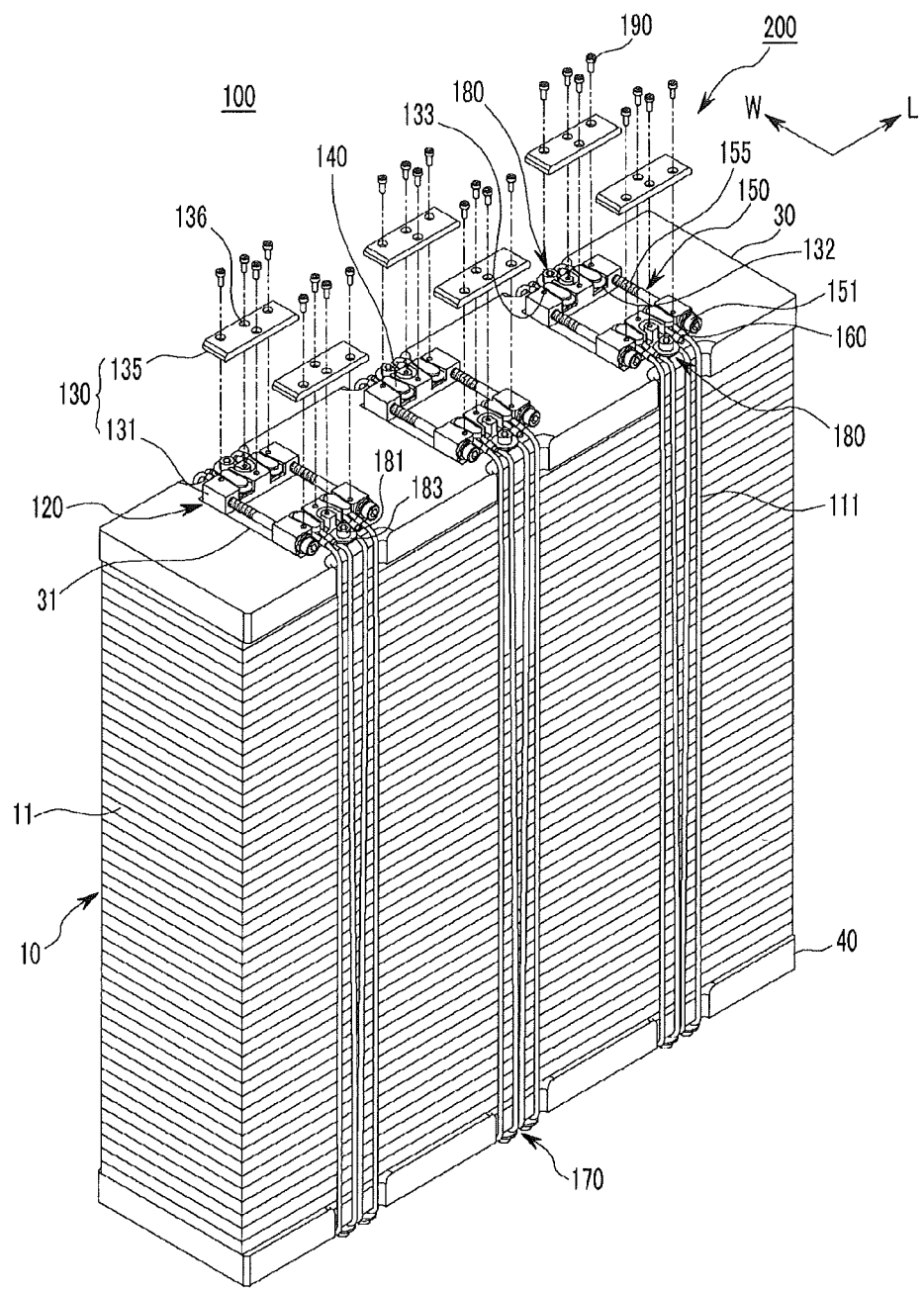
FIG. 3 is a partial exploded perspective view showing a joining device for a fuel cell stack according to an exemplary embodiment of the present invention.
Figure 4:
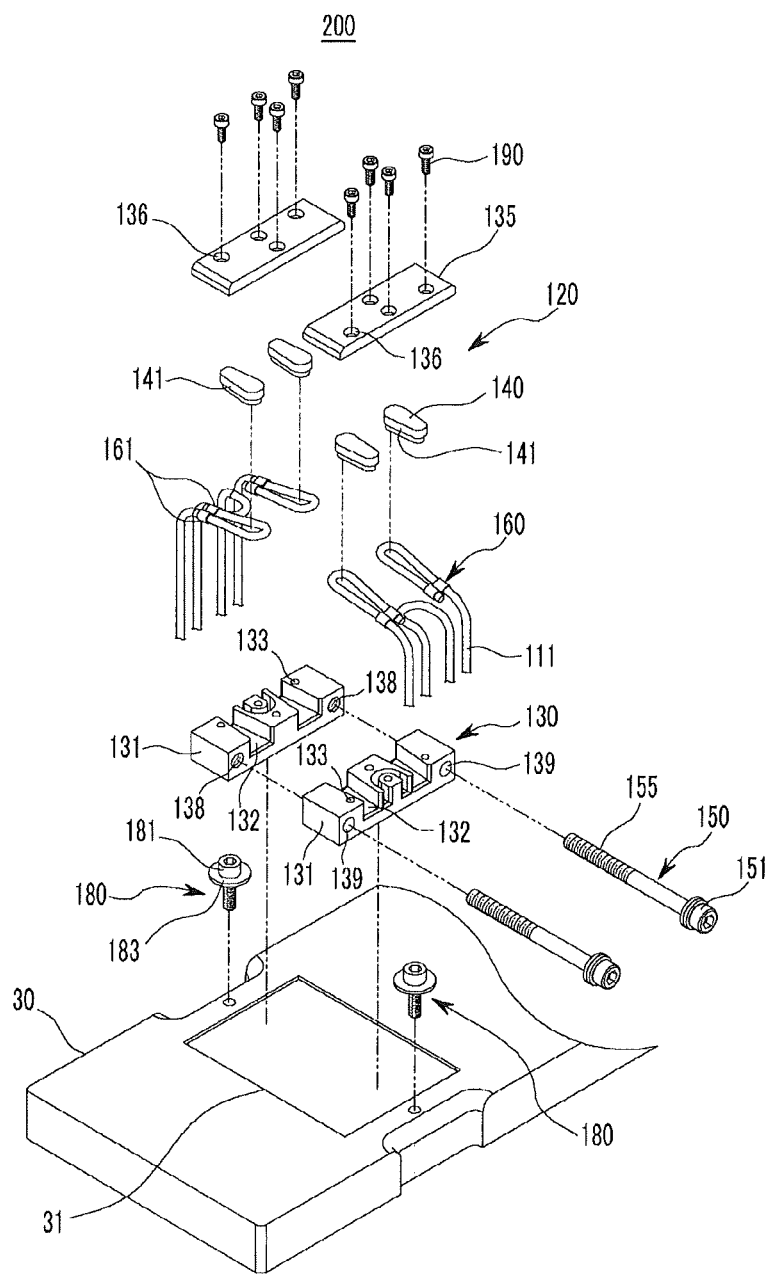
FIG. 4 is an entire exploded perspective view of FIG. 3.
Figure 5:
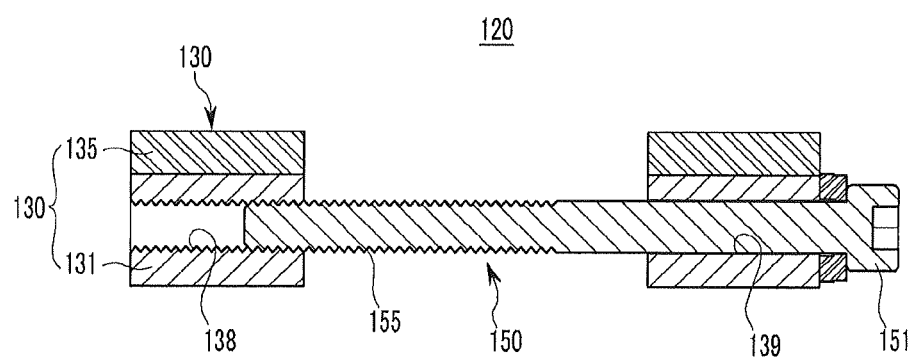
FIG. 5 is a partial cross-sectional view of FIG. 4.

FIG. 3 is a partial exploded perspective view showing a joining device for a fuel cell stack according to an exemplary embodiment of the present invention. FIG. 4 is an entire exploded perspective view of FIG. 3. FIG. 5 is a partial cross-sectional view of FIG. 4.

According to preferred exemplary embodiments, and referring to the drawings, the joining device 200 of the fuel cell stack 100 according to an exemplary embodiment of the present invention suitably connects one side of the first and second end plates 30 and 40 by one rope 111, suitably connects the other side of the first and second end plates 30 and 40 facing the one side by another rope 111, suitably supplies tension to the ropes 111 by engaging the one rope 111 connecting the one side with the other rope 111 connecting the other side, and suitably presses the electricity generating assembly 10. Accordingly, one end of one rope 111 is suitably connected to one side portion of the second end plate 40 and the other end of the one rope 111 is suitably connected to the joining device 200 mounted at the one side portion of the first end plate 30. In addition, one end of another rope 111 is suitably connected to the other side portion of the second end plate 40 and the other end of the other rope 111 is suitably connected to the joining device 200 mounted at the other side portion of the first end plate 30. As described herein, the first and second end plates 30 and 40 are pressed by connecting one rope 111 catching one side of the first and second end plates 30 and 40 with another rope 111 catching the other side of the first and second end plates 30 and 40 through the joining device 200 and controlling the length and the tension of the ropes 111.

Accordingly, the joining device 200 can suitably control the length and the tension (engaging force) of the ropes 111 according to the height of the electricity generating assembly 10.

In further preferred embodiments of the present invention, the rope 111 is formed by twisting a plurality of thin steel wires. Preferably, in order to prevent the electricity generating assembly 10 from being shorted, the ropes 111 should be suitably connected to the joining device 200 carefully so as to not contact the electricity generating assembly 10. In further exemplary embodiments, the ropes 111 may be preferably made of metal materials, but may be made of other materials that generate strong tension.

Preferably, a joining device 200 according to a further exemplary embodiment includes a fastener assembly 120, a first hook unit 170, and a second hook unit 180, and constituent elements will be described later in detail.

According to another further exemplary embodiment, a plurality of fastener assemblies 120 are suitably disposed at an upper surface of the first end plate 30 along the length direction L thereof at constant spacing.

Preferably, each fastener assembly 120 suitably connects the other ends of the ropes connected to both end portions of the first end plate 30, and supplies the tension (engaging force) to the ropes 111.

Accordingly, each fastener assembly 120 preferably includes a pair of engagement blocks 130, a plurality of wedge members 140 to which each rope 111 is suitably coiled and that are mounted at each engagement block 130, a lead screw 150 suitably connecting the pair of engagement blocks 130 facing each other, and a tie member 160 fixing the rope 111 coiled to the wedge member 140.

According to another further exemplary embodiment, the pair of engagement blocks 130 are suitably disposed in one of receiving grooves 31 formed at the upper surface of the first end plate 30 along the length direction L thereof.

Preferably, the pair of engagement blocks 130 are suitably disposed in the receiving groove 31, and are slidable in the receiving groove 31 along a width direction W of the first end plate 30 so as to come closer or go farther from each other.

According to further exemplary embodiments, such an engagement block 130 includes a base member 131 and a cover member 135 mounted on an upper surface of the base member 131.

Preferably, the base member 131 is suitably disposed in the receiving groove 31 of the first end plate 30, and is suitably formed of a pair of wedge grooves 132 at an upper surface thereof. Preferably, the wedge member 140 is engaged to the wedge groove 132.

Further, the cover member 135 is used for covering the upper surface of the base member 131, and is suitably engaged to the upper surface of the base member 131 through a bolt 190.

According to preferred embodiments, for this purpose, a plurality of bolt holes 133 is suitably formed at the upper surface of the base member 131 and a plurality of bolt holes 136 corresponding to the bolt holes 133 are suitably formed at the cover member 135.

According to another preferred exemplary embodiment, the wedge member 140 is suitably engaged to each engagement block 130. Preferably, the other end of the rope 111 is suitably connected to the wedge member 140 and is suitably pressed to the engagement block 130.

Further, according to certain embodiments, it is exemplarily described that a pair of wedge member 140 are suitably engaged to the base member 131 of the engagement block 130. Preferably, the wedge member 140 has the same shape as the wedge groove 132 so as to be suitably engaged to the wedge groove 132 of the base member 131.

Preferably, in order to prevent the wedge member 140 from being suitably disengaged from the wedge groove 132 by the tension of the rope 111 when the wedge member 140 is suitably engaged to the wedge groove 132, the wedge member 140 and the wedge groove 132 have predetermined shapes. For example, in certain preferred embodiments, the widths of the wedge member 140 and the wedge groove 132 may become narrower along a direction where the tension of the rope 111 is exerted. In this case, for example, if the tension of the rope 111 is suitably applied to the wedge member 140, the wedge member 140 is caught by the wedge groove 132 and is not disengaged from the wedge groove 132. Preferably, the wedge member 140 and the wedge groove 132 have any shape that suitably prevents the wedge member 140 from being disengaged from the wedge groove 132 by the tension of the rope 111.

According to further preferred embodiments of the present invention, the wedge member 140 is formed of a rope groove 141 at an exterior circumference thereof. Preferably, the rope 111 is suitably inserted therein and is not left from the rope groove 141. Preferably, the rope groove 141 has a semicircular cross-section such that the rope 111 is inserted in the rope groove 141.

According to another further exemplary embodiment, the lead screw 150 is suitably engaged to the pair of engagement blocks 130 that are suitably disposed in the receiving groove 31, and suitably controls the length and the tension of the rope 111 by controlling the distance between the pair of engagement blocks 130.

According to another further embodiment of the present exemplary embodiment, a pair of lead screws 150 are suitably provided in order to engage the pair of engagement blocks 140, but only one lead screw 150 may be provided. Further, three or more lead screws 150 may be used for engaging the pair of engagement blocks 140. Preferably, a thread is formed at a part of the lead screw 150, and the other part of the lead screw 150 having a head portion 151 has a rod shape.

In further preferred embodiments, a part of each lead screw 150 is suitably threaded to one of the pair of engagement blocks 130, and the other part of the lead screw 150 is suitably inserted in the other of the pair of engagement blocks 130.

Accordingly, a pair of threaded holes 138 threaded to the part of the lead screw 150 are suitably formed at the base member 131 of the one engagement block 130, and a pair of penetration holes 139 in which the other part of the lead screw 150 is suitably inserted are formed at the base member 131 of the other engagement block 130.

According to another further exemplary embodiment, the tie member 160 suitably fixes the rope 111 coiled to the wedge member 140. Accordingly, when the fuel cell stack 10 is suitably assembled, the tie member 160 prevents the rope 111 from being uncoiled from the wedge member 140.

Preferably, the tie member 160 is provided with a pair of tubes 161 that are integrally connected to each other, and the shape of the tie member can be changed by a tool. In further related embodiments, the rope 111 is inserted in one tube 161 and then in the other tube 161. Accordingly, in a state of being inserted in one tube 161, the rope 111 is suitably inserted in the other tube 161.

Preferably, fixing processes of the rope 111 to the wedge member 140 are performed as follows.

According to preferred embodiments of the present invention, the rope 111 is coiled to the wedge member 140, and the tie member 160 is suitably moved toward the wedge member 140 so as to fix the rope 111 to the wedge member 140. Preferably, after that, the tie member 160 is suitably deformed by the tool in order to be tightly fixed to the rope 111.

Preferably, according exemplary embodiments described herein, in a state in which the other end of the rope 111 is suitably connected to the engagement block 130 through the wedge member 140, the one end of the rope 111 is hooked to the first hook unit 170. Therefore, the rope 111 is fixed to the second end plate 40.

Preferably, the first hook units 170 is mounted on both end portions of the second end plate 40 along the length direction L thereof suitably corresponding to each fastener assembly 120.

Preferably, the first hook unit 170 includes a hook bolt 171 engaged to both end portions of the second end plate 40 along the length direction L thereof.

In further preferred embodiments, the first hook unit 170 further includes a washer 173 for suitably preventing the rope 111 hooked to the hook bolt 171 from being unhooked from the hook bolt 171. Preferably, the washer 173 is suitably engaged to the hook bolt 171.

According to another further exemplary embodiment, in a state in which the one end of the rope 111 is suitably hooked to the hook bolt 171 of the first hook unit 170, the other end of the rope 111 is suitably fixed to the first end plate 30 through the second hook unit 180.

Preferably, the second hook unit 180 is suitably mounted at both end portions of the first end plate 30 along the length direction L thereof corresponding to each fastener assembly 120.

Further, the second hook unit 180, the same as the first hook unit 170, preferably includes a hook bolt 181 and a washer 183.

Exemplary processes for assembling the fuel cell stack 100 by using the joining device 200 according to exemplary embodiments of the present invention are described herein.

Preferably, after the plurality of unit cells 11 are suitably laminated so as to form the electricity generating assembly 10, the first and second end plates 30 and 40 are suitably disposed respectively at upper and lower ends of the electricity generating assembly 10.

Further, in a state that the rope 111 is suitably coiled to the rope groove 141 of the wedge member 140 and is fixed by the tie member 160, the wedge member 140 is suitably engaged to the wedge groove 132 of the engagement block 130.

In certain preferred embodiments, the rope 111 is suitably coiled to the wedge member 140 and is fixed through the tie member 160 to prevent the rope 111 from being uncoiled from the wedge member 140 when the tension of the rope 111 is not applied. Therefore, assembling workability may suitably improve.

In further exemplary embodiments, after that, the one end of the rope 111 is hooked to the first hook unit 170 mounted at the second end plate 30, and the other end of the rope 111 is suitably hooked to the second hook unit 180 mounted at the first end plate 30.

Preferably, since the washers 173 and 183 are suitably mounted respectively at the first and second hook units 170 and 180, the rope hooked to the hook bolts 171 and 181 is not suitably disengaged from the hook bolts 171 and 181 because of the washers 173 and 183.

Figure 6:
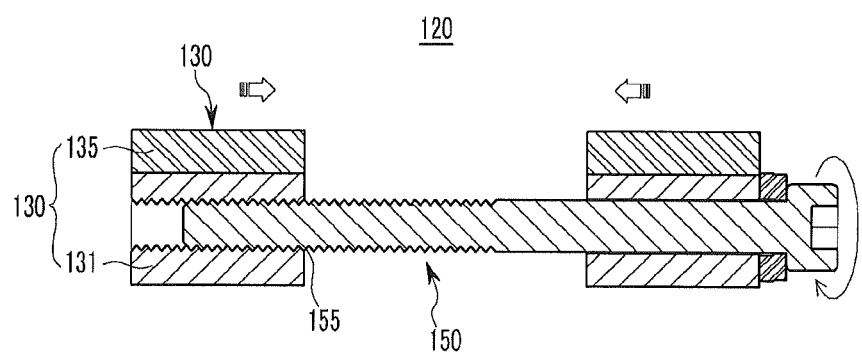
FIG. 6 and FIG. 7 show engaging processes of a fuel cell stack according to an exemplary embodiment of the present invention.

Preferably, at this state, the lead screw 150 is suitably tightened as shown in FIG. 6. Since the thread 155 is formed at the one part of the lead screw 150 but is not formed at the other part of the lead screw 150, the pair of engagement blocks 130 slide in the receiving groove 31 of the first end plate 30 along the width direction W thereof and come closer to each other.

Preferably, then, the tension of the rope 111 suitably increases and the wedge member 140 moves along the width direction W of the first end plate 30 by the tension of the rope 111. After that, the wedge member 140 is fitted in the wedge groove 132.

Accordingly, if the lead screw 150 continues to be tightened, the wedge member 140 is completely fitted in the wedge groove 132 and suitably presses the rope 111 to the wedge groove 132.

According to further exemplary embodiments, since the engagement block 130 is provided such that the cover member 135 is suitably engaged to the upper surface of the base member 131 by the bolt 190, the wedge member 140 is prevented from being disengaged upwardly in the drawings from the wedge groove 132. Further, since the thickness of the wedge member 140 and the wedge groove 132 becomes narrower along the direction where the tension of the rope 111 is exerted, the wedge member 140 is not suitably disengaged from the wedge groove 132 even if the tension increases.

Preferably, in a state in which the rope 111 is suitably connected to the engagement block 130 through the wedge member 140 and is hooked to the first and second hook units 170 and 180, the lead screw 150 is suitably operated such that the tension is applied to the rope 111 and the first and second end plates 30 and 40 are engaged with each other.

Further, since the tension of the rope 111 presses the first and second end plates 30 and 40 disposed respectively at the upper and lower ends of the electricity generating assembly 10, the electricity generating assembly 10 is suitably pressed by the first and second end plates 30 and 40.

In further exemplary embodiments, in a state in which the rope 111 is suitably coiled to the wedge member 140, the wedge member 140 is fitted to the wedge groove 132 of the engagement block 130. Therefore, the rope 111 is strongly pressed to the wedge groove 132 and is not uncoiled from the wedge member 140.

Preferably, since frictional force applied to the rope 111 between the wedge member 140 and the wedge groove 132 is equal to or stronger than the tension applied to the rope 111, the rope 111 is not uncoiled from the wedge member 140.

Figure 7:
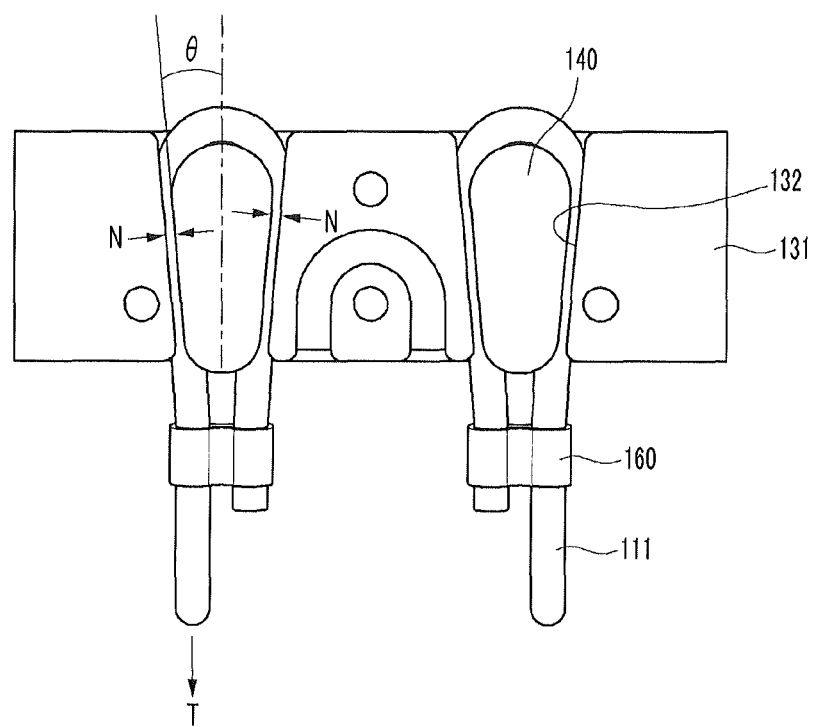

Further, preferably, since width of the wedge member 140, for example as shown in FIG. 7, becomes narrower along the direction where the tension T is applied, a normal force N pressing the rope 111 increases as an angle θ between a central axis and an edge line of the wedge member 140 decreases, as shown in Equation 1.

$$N=0.5T/\sin\theta \quad \text{(Equation 1)}$$

Here, T represents the tension of the rope.

Accordingly, maximum frictional force $F_{max}$ applied to the rope 111 between the wedge member 140 and the wedge groove 132 increases as the normal force N increases, as shown in Equation 2. Therefore, uncoiling of the rope from the wedge member 140 is suitably prevented by the tension T of the rope 111.

$$F_{max}=4N\mu=2T\mu/\sin\theta \quad \text{(Equation 2)}$$

As described herein, the fuel cell stack 100 according to exemplary embodiments of the present invention applies the tension to the rope 111 by using the fastener assembly 120 and the hook units 170 and 180 so as to suitably engage the end plates 30 and 40, and presses the electricity generating assembly 10.

Accordingly, the present invention differs from the conventional art in which end plates are engaged by an engagement bolt and a nut. That is, since the end plates 30 and 40 are suitably engaged by the rope 111 according to embodiments of the present invention as described herein, dead volume of the end plates can be suitably eliminated, and the overall size of the stack 100 may be compact. Accordingly, in preferred embodiments, the stack 100 may be easily mounted to a vehicle.

Further, according to certain preferred embodiments, since the engagement length of the rope 111 can be suitably controlled by an operation of the lead screw 150 suitable pressure can be applied to the electricity generating assembly 10 by the end plates 30 and 40 even if the height of the electricity generating assembly 10 is changed.

Further, since the tension of the rope 111 can be suitably controlled by the operation of the lead screw 150 according to preferred exemplary embodiments as described herein, suitable tension corresponding to engagement force of the electricity generating assembly 10 may be easily applied to the end plates 30 and 40.

In further preferred embodiments, since the rope 111 is suitably coiled to the wedge member 140 and the wedge member 140 is suitably engaged to the wedge groove 132 of the engagement block 130, the rope 111 may not be uncoiled from the wedge member 140 when the tension is applied to the rope 111.

According to certain exemplary embodiments of the present invention, end plates are suitably engaged to each other and an electricity generating assembly is suitably pressed as a consequence of applying tension to a rope by means of a fastener assembly and a hook unit.

Accordingly, in exemplary embodiments described herein, using the rope for engaging the end plates is different from the conventional art in which the end plates are engaged by an engagement bolt and a nut. Further, dead volume of the end plates may be suitably eliminated and the overall size of the stack may be suitably compact. In further preferred embodiments, the stack may be easily mounted to a vehicle.

Preferably, according to preferred embodiments of the present invention as described herein, since the engagement length of the rope can be suitably controlled by an operation of the lead screw, suitable pressure can be suitably applied to the electricity generating assembly by the end plates even if the height of the electricity generating assembly is changed.

Further, since the tension of the rope can be suitably controlled by the operation of the lead screw according preferred embodiments of the present invention as described herein, suitable tension corresponding to engagement force of the electricity generating assembly may be easily applied to the end plates.

Preferably, since the rope is coiled to the wedge member and the wedge member is suitably engaged to the wedge groove of the engagement block according to the present exemplary embodiment, the rope may not be uncoiled from the wedge member when the tension is applied to the rope.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A joining device for a fuel cell stack that pressedly engages a pair of end plates disposed at upper and lower ends of a plurality of unit cells disposed one after another by a rope made up of a first rope and a second rope, the joining device comprising:

a plurality of fastener assemblies disposed at both side portions of one end plate along a length direction thereof, wherein the fastener assemblies are connected to the first rope catching one side portion of the unit cells and to the second rope catching the other side portion of the unit cells, and supplying tension to the rope; and a plurality of hook units mounted at both side portions of the other end plate corresponding to each fastener assembly along the length direction so as to hook each rope, wherein each fastener assembly includes:

a pair of engagement blocks disposed on the one end plate and being slidable along a width direction thereof;

a plurality of wedge members engaged to each engagement block so as to connect the ropes catching both side portions of the unit cells through the engagement block, and pressing the ropes to the engagement block; and at least one lead screw engaged to the pair of engagement blocks so as to control a distance therebetween, and supplying the tension to the ropes.

* * * * *